United States Patent [19]

Ishikawa et al.

[11] Patent Number: 5,218,540
[45] Date of Patent: Jun. 8, 1993

[54] METHOD OF CONTROLLING CONTINUOUSLY VARIABLE TRANSMISSION IN COMBINATION WITH ENGINE THROTTLE CONTROL

[75] Inventors: Yoshikazu Ishikawa; Kouji Yamaguchi, both of Saitama, Japan

[73] Assignee: Honda Giken Kogyo Kabushiki Kaisha, Tokyo, Japan

[21] Appl. No.: 497,510

[22] Filed: Mar. 22, 1990

[30] Foreign Application Priority Data

Mar. 22, 1989 [JP] Japan .................................. 1-70151

[51] Int. Cl.$^5$ ............................................. B60K 41/16
[52] U.S. Cl. ..................................... 364/424.1; 74/866
[58] Field of Search .................. 364/42.41, 426.04; 74/866

[56] References Cited

U.S. PATENT DOCUMENTS

| | | | |
|---|---|---|---|
| 4,337,511 | 6/1982 | Schneider et al. | 364/426 |
| 4,459,806 | 7/1984 | Falk | 60/327 |
| 4,479,184 | 10/1984 | Nakano | 364/424.1 |
| 4,541,052 | 9/1985 | McCulloch | 364/424.1 |
| 4,630,508 | 12/1986 | Klatt | 74/866 |
| 4,641,553 | 2/1987 | Kobayashi | 74/866 |
| 4,671,138 | 6/1987 | Nobumoto et al. | 74/862 |
| 4,677,560 | 6/1987 | Cao et al. | 364/431.07 |
| 4,720,793 | 1/1988 | Watanabe | 364/424.1 |
| 4,750,598 | 6/1988 | Danno et al. | 192/0.058 |
| 4,817,469 | 4/1989 | Shigematsu | 74/866 |
| 4,833,944 | 5/1989 | Tanaka | 74/866 |
| 4,852,429 | 8/1989 | Kunzer | 74/866 |
| 4,893,526 | 1/1990 | Tokoro | 74/866 |
| 4,926,716 | 5/1990 | Hirano et al. | 364/424.1 |
| 4,938,101 | 7/1990 | Maki | 74/866 |
| 4,947,953 | 8/1990 | Morimoto | 364/426.04 |
| 4,949,596 | 8/1990 | Iino | 74/864 |
| 4,976,169 | 12/1990 | Sasajima et al. | 364/424.1 |
| 5,040,114 | 8/1991 | Ishikawa et al. | 364/424.1 |

FOREIGN PATENT DOCUMENTS

| | | |
|---|---|---|
| 0240178 | 10/1987 | European Pat. Off. . |
| 0253657 | 1/1988 | European Pat. Off. . |
| 61-8305 | 3/1983 | Japan . |
| 58-180864 | 10/1983 | Japan . |
| 62-52177 | 6/1985 | Japan . |
| 63-53343 | 3/1988 | Japan . |
| 63-53344 | 3/1988 | Japan . |
| 63-53345 | 3/1988 | Japan . |
| 63-53346 | 3/1988 | Japan . |
| 79/00036 | 2/1979 | PCT Int'l Appl. . |

*Primary Examiner*—Salvatore Gangialosi
*Attorney, Agent, or Firm*—Lyon & Lyon

[57] ABSTRACT

A continuously variable transmission on a motor vehicle is controlled by establishing a target terminal acceleration GO to be reached according to an indication of the driver's intention for acceleration or deceleration, such as the amount of depression of the accelerator pedal, and also to an indication of the speed of the motor vehicle. A present calculative acceleration $G_{CAL}$ is calculated on the basis of a marginal power Pa of the engine which drives the continuously variable transmission. A target present acceleration Gon required at the present time to vary the present acceleration up to the target terminal acceleration Go to be reached along a desired characteristic curve is established according to the difference $\Delta G$ (=Go−$G_{CAL}$) between the target terminal acceleration Go to be reached and the calculative acceleration $G_{CAL}$. Then, the throttle valve of the engine on the motor vehicle and the continuously variable transmission are controlled so that the target terminal acceleration Gon will be reached.

15 Claims, 7 Drawing Sheets

METHOD OF CONTROLLING CONTINUOUSLY VARIABLE TRANSMISSION IN COMBINATION WITH ENGINE THROTTLE CONTROL

BACKGROUND OF THE INVENTION

The present invention relates to a method of controlling a continuously variable transmission on a motor vehicle or the like, and more particularly to a method of controlling a continuously variable transmission in combination with the control of the throttle valve of an engine.

Heretofore, continuously variable transmissions having generally been controlled such that (a) the rotational speed of an engine coupled to the continuously variable transmission will reach a target speed, (b) the rate of change of the rotational speed of the engine will reach a target rate, and (c) the speed reduction ratio or transmission ratio of the transmission will reach a target ratio.

According to another method of controlling a continuously variable transmission, the rate of change of a speed reduction ratio is controlled, the rate being calculated as the sum of a component corresponding to a predicted acceleration that is calculated from a reserved horsepower of an engine coupled to the transmission and a component corresponding to a target rate of change of the engine rotational speed (see, for example, Japanese Laid-Open Patent Publication No. 63-53343 filed by the applicant). The reserved power is a power which is available corresponding to the present accelerator opening but is not used. In other word, the engine can afford to output the reserved power under the present accelerator opening.

There is also known a method of simultaneously controlling a continuously variable transmission and the throttle valve of an engine coupled to the continuously variable transmission, so that the engine and a system for actuating the continuously variable transmission will always be controlled to operate the engine at a minimum fuel consumption rate (see Japanese Patent Publication No. 61-8305, for example).

The conventional control methods described above pose no problem insofar as the motor vehicle runs steadily or is gradually accelerated or decelerated. However, when the motor vehicle runs transiently, such as when the accelerator pedal is abruptly depressed to accelerate the motor vehicle, the rate of change of a controlled value until it reaches a target value may not necessarily best match the demand desired by the driver of the motor vehicle. Accordingly, under transient running conditions of the motor vehicle, the driver may not experience the desired feeling as to the driving conditions of the motor vehicle. For example, according to the conventional control methods, when the accelerator pedal is depressed, the rotational speed of the engine is increased to a speed value corresponding to the depth to which the accelerator pedal is depressed (the amount of depression of the accelerator pedal), and then the motor vehicle is accelerated while the engine rotational speed is being kept constant. Therefore, the rotational speed of the engine or the rate of change of the rotational speed of the engine does not match the motor vehicle acceleration as felt by the driver, and the depression of the accelerator pedal also does not match the motor vehicle acceleration as felt by the driver.

In view of the fact that the accelerator pedal depression is an indication of the intention of the driver for acceleration or deceleration, there has been disclosed a transmission control method in which a target acceleration is established depending on the depth to which the accelerator pedal is depressed, and the transmission is controlled to arrive at the target acceleration (see Japanese Patent Publication No. 62-52177).

According to this transmission control method, however, inasmuch as a target acceleration which is once established remains at one value, when the accelerator pedal is depressed and thereafter held in the depressed position, the target acceleration remains unchanged even if the speed of the motor vehicle goes higher as the vehicle is accelerated. As a result, the target acceleration deviates from a motor vehicle acceleration which is desired by the driver. Furthermore, when the accelerator pedal is released back for deceleration, the transmission is controlled for a lower speed reduction ratio, i.e., for a top position, and hence the motor vehicle is decelerated without much of an engine brake being applied.

SUMMARY OF THE INVENTION

In view of the aforesaid problems of the conventional continuously variable transmission control methods, it is an object of the present invention to provide a method of controlling a continuously variable transmission on a motor vehicle to enable the motor vehicle to run in a manner to give the driver an acceleration or deceleration feeling which matches the demand of the driver according to an indication of the driver's will or intention for acceleration or deceleration, such as the amount of depression of an accelerator pedal.

According to the control method of the present invention, a target terminal acceleration Go to be reached is established according to an indication of the driver's intention for acceleration or deceleration, such as the amount of depression of the accelerator pedal, and also according to an indication of the speed of the motor vehicle, and a present calculative acceleration $G_{CAL}$ is calculated on the basis of a reserved power at the present time of the engine which drives the continuously variable transmission. Then, a target present acceleration Gon required at the present time to vary the present acceleration up to the target terminal acceleration Go along a desired characteristic curve (e.g., a characteristic curve which gives the driver an acceleration feeling that is demanded by the driver) is established according to the difference $\Delta G(=Go-G_{CAL})$ between the target terminal acceleration Go to be reached and the calculative acceleration $G_{CAL}$. Thereafter, the throttle valve of the engine and the continuously variable transmission are controlled so that the target present acceleration Gon will be reached.

With the continuously variable transmission being thus controlled, the acceleration (or deceleration) of the motor vehicle is directly controlled along the desired characteristic curve depending on a change in the indication of the driver's intention for acceleration or deceleration, such as the amount of depression of the accelerator pedal. Therefore, the motor vehicle runs in a manner to meet the demand for acceleration, represented by the depression by the driver of the accelerator pedal. Since the transmission and the throttle valve are controlled using, as a target value, the acceleration (or deceleration) whose changes can be sensed by the driver, the desired characteristic which meets the demand of the driver is reliably achieved.

When the target acceleration is to be established, the calculative acceleration $G_{CAL}$ which is calculated on the basis of the reserved engine power is employed rather than an acceleration that is obtained on the basis of a measured value indicated by an acceleration sensor, a vehicle speed sensor, or the like. If an acceleration sensor were employed, it would be difficult to accomplish accurate control since the accuracy of the acceleration sensor would be lowered by vibrations of the motor vehicle during travel. Furthermore, in order to perform a transient control mode in which the accelerator pedal is abruptly depressed, for example, each of the control cycles is quite short (e.g., 10 ms). Since, however, the feedback system which is employed suffers from a detection delay (due to the delay after the engine output power is increased and before the motor vehicle is actually accelerated), the detected value from the sensor deviates from a correct value at the time, and hence correct control depending on the conditions at the time cannot be accomplished. In addition, if the acceleration were established on the basis of the measured value from the vehicle speed sensor, any detection error of the vehicle speed sensor would greatly affect the control process using the short control cycles. These problems are not encountered when the calculated acceleration is employed according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
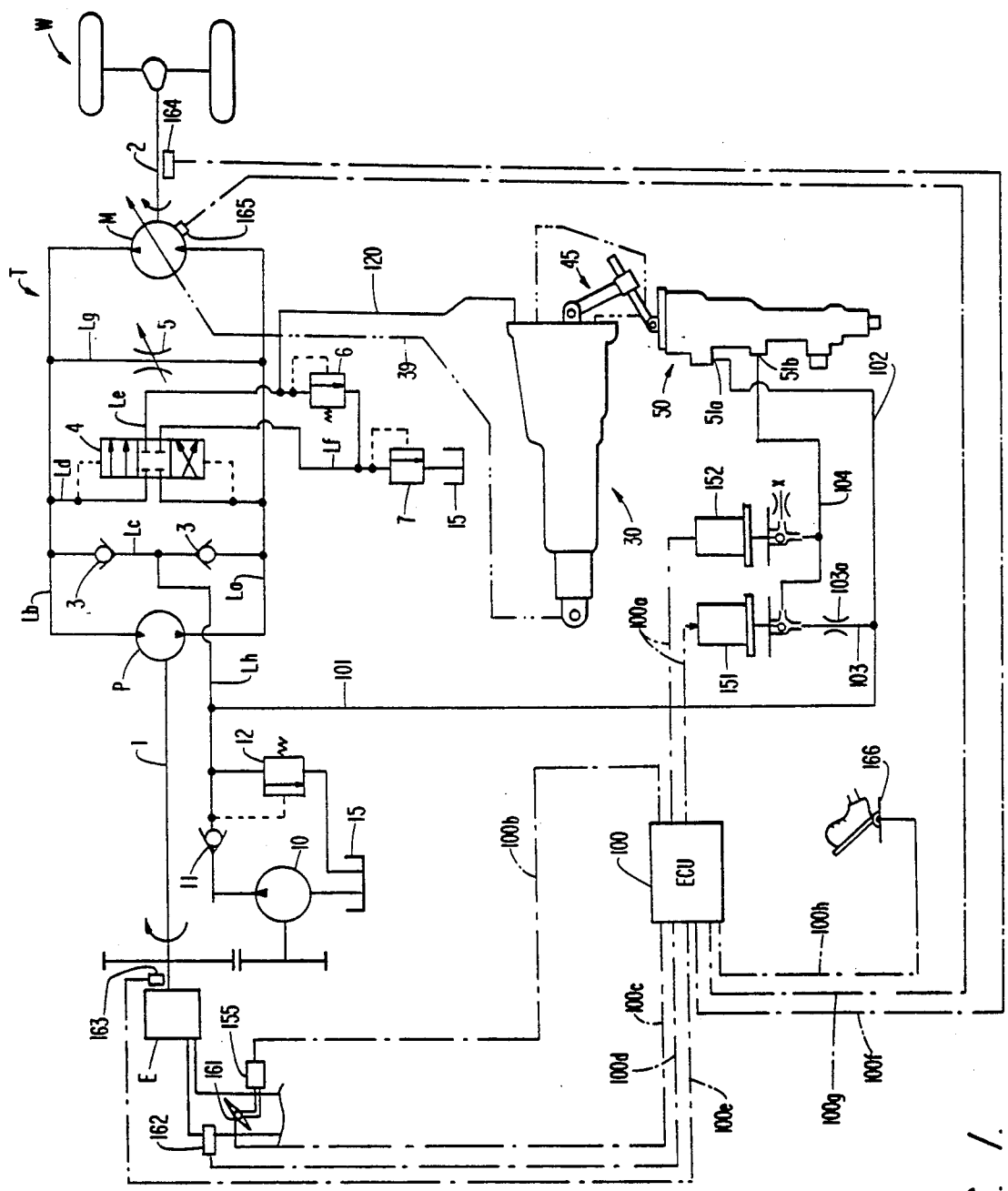
FIG. 1 is a circuit diagram of a hydraulic circuit of a continuously variable transmission to be controlled by a method of the present invention.

FIG. 1 shows a hydraulic circuit of a continuously variable transmission which is to be controlled by a control method according to the present invention. The continuously variable transmission, generally designated by the reference numeral T, has a fixed-displacement hydraulic pump P drivable by an engine E on a motor vehicle through an input shaft 1 and a variable-displacement hydraulic motor M having an output shaft 2 for driving road wheels W of the motor vehicle. The hydraulic pump P and the hydraulic motor M are hydraulically connected to each other through a closed hydraulic circuit including a first oil passage La interconnecting the outlet port of the pump P and the inlet port of the motor M and a second oil passage Lb interconnecting the inlet port of the pump P and the outlet port of the motor M.

A changing pump 10 drivable by the engine E has an outlet port connected to the closed hydraulic circuit through a charging oil passage Lh having check valve 11 and a third oil passage Lc having a pair of check valves 3. Working oil supplied from an oil sump 15 by the charging pump 10 and regulated in pressure by a charging pressure relief valve 12 is supplied through one of the check valves 3 to a lower-pressure one of the oil passages La, Lb. To the closed hydraulic circuit there is also connected a fourth oil passage Ld having a shuttle valve 4 coupled to fifth and sixth oil passages Le, Lf having, respectively, higher- and lower-pressure relief valves 6, 7 and connected to the oil sump 15. The shuttle valve 4 which comprises a two-port three-position directional control valve is operable in response to the difference between oil pressures in the first and second oil passages La, Lb for connecting a higher-pressure one of the first and second oil passages La, Lb to the fifth oil passage Le and the lower-pressure oil passage to the sixth oil passage Lf. Therefore, the oil pressure relieved from the higher-pressure oil passage is regulated by the higher-pressure relief valve 6, whereas the oil pressure relieved from the lower-pressure oil passage is regulated by the lower-pressure relief valve 7.

Between the first and second oil passages La, Lb, there is connected a seventh oil passage Lg having a clutch valve 5 which comprises a variable restriction controlled by an opening control unit (not shown) for controlling the opening of the seventh oil passage Lg. The transmission of the drive power from the hydraulic pump P to the hydraulic motor M can be controlled through the control of the cross-sectional flow area in the clutch valve 5.

An actuator for controlling the displacement of the hydraulic motor M to control the speed reduction ratio or transmission ratio of the continuously variable transmission T comprises a pair of first and second servovalves 30, 50 mechanically operably coupled to each other by a link mechanism 45. The hydraulic motor M comprises a swash-plate axial-piston motor whose displacement can be controlled by controlling the angle of the swash plate thereof.

The structure and operation of the servovalves 30, 50 will be described below with reference to FIGS. 1 and 2.

The higher-pressure working oil supplied from the closed hydraulic circuit of the continuously variable transmission T through the shuttle valve 4 to the fifth oil passage Le is introduced into the first servovalve 30 through a high-pressure line 120 branched from the fifth oil passage Le. The first servovalve 30 controls the swash plate angle of the hydraulic motor M under the higher-pressure working oil thus introduced. The second servovalve 50 controls operation of the first servovalve 30 through the link mechanism 45 by which the second servovalve 50 is operatively coupled to the first servovalve 30.

The first servovalve 30 comprises a housing 31 having a port 31a connected to the high-pressure line 120, a piston member 32 slidably disposed in the housing 31, and a spool member 34 coaxially slidably disposed in the piston 32. The piston member 32 has a piston 32a on its righthand (as shown) end, and a cylindrical rod 32b extending coaxially from the piston 32a to the left (as shown). The piston 32a is positioned in a cylinder hole 31c defined in the housing 31 and divides the space of the cylinder hole 31c into left and right (as shown) cylinder chamber 35, 36. The rod 32b is slidably fitted in a rod hole 31d which is smaller in a diameter than and extends coaxially from the cylinder hole 31c. The right cylinder chamber 35 is closed by a plug 33a and a cover 33b. The spool member 34 extends through the piston 32a, the right cylinder chamber 36, the plug 33a, and the cover 33b.

The left cylinder chamber 35 communicates with the high-pressure line 120 through an oil passage 31b defined in the housing 31. The piston member 32 can therefore be moved to the right under the oil pressure introduced from the high-pressure line 120 into the left cylinder chamber 35.

The spool member 34 has on its distal end a land 34a closely fitted in a spool hole 32d defined coaxially in the rod 32b. The spool member 34 also has a recess 34b defined on the righthand side of the land 34a by a pair of diametrically opposite cutouts, the recess 34b having a predetermined axial dimension. A retaining ring 37 is fitted over the spool member 34 on the righthand side of the recess 34b. The spool member 34 is prevented from removal from the piston member 32 by the retaining ring 37 upon engagement with another retaining ring 38 locked in an inner peripheral surface of the piston member 32.

The piston member 32 has defined therein a discharge passage 32e for opening the right cylinder chamber 36 into an oil sump (not shown) through the spool hole 32d upon rightward movement of the spool member 34, and a communication passage 32c for bringing the right cylinder chamber 36 into communication with the left cylinder chamber 35 through the recess 34b upon leftward movement of the spool member 34.

Figure 2:
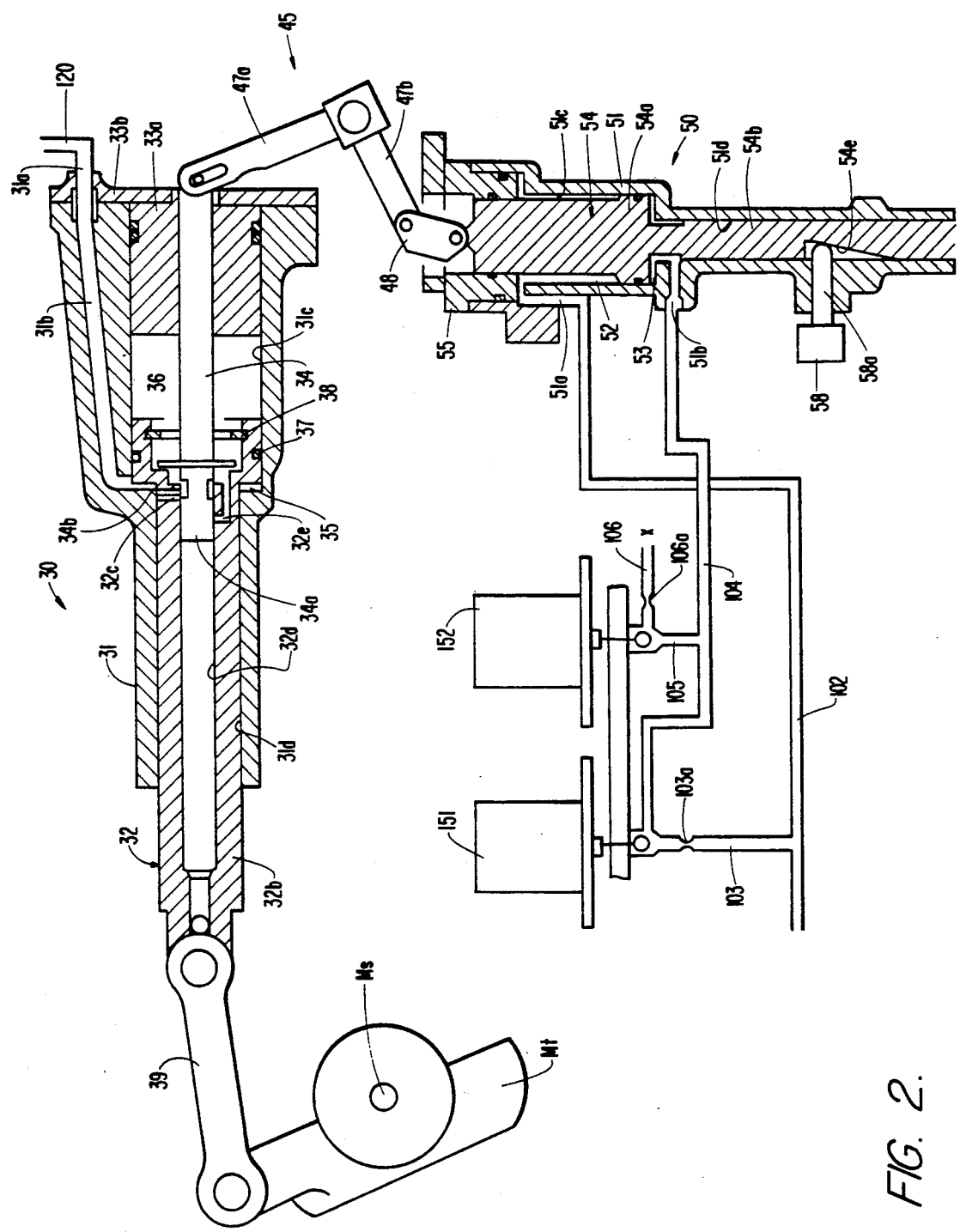
FIG. 2 is a cross-sectional view of servovalves for controlling the continuously variable transmission.

When the spool member 34 is moved to the right from the position shown in FIG. 2, the land 34a closes the communication passage 32c and opens the discharge passage 32e. Therefore, the oil supplied under pressure from the high-pressure line 120 through the oil passage 31b acts in only the left cylinder chamber 35, thus moving the piston member 32 to the right in follow-up coaction with the spool member 34.

When the spool member 34 is then moved to the left, the recess 34b opens the communication passage 32c into the right cylinder chamber 36, and the land 34a closes the discharge chamber 32e. The high-pressure oil from the high-pressure line 120 into then acts in both the left and right cylinder chambers 35, 36. Since the piston 32a has different pressure-bearing surface areas on its axially opposite sides, i.e., the righthand pressure-bearing surface area is greater than the lefthand pressure-bearing surface area, the piston 32 is moved to the left in follow-up coaction with the spool member 34.

When the spool member 34 is stopped somewhere in its stroke, because the oil pressures in the cylinder chambers 35, 36 are maintained in equilibrium, the piston member 32 is kept in a hydraulically balanced condition and is also stopped.

Therefore, by moving the spool member 34 to the left or right, the piston member 32 is moved in follow-up unison with the spool member 34 under the pressure of the oil supplied from the high-pressure line 120. The piston member 32 then causes a link 39 coupled thereto to turn the swash plate Mt of the hydraulic motor M about a shaft Ms for thereby varying the displacement of the hydraulic motor M.

The spool member 34 is operatively coupled to the second servovalve 50 by the link mechanism 45. The link mechanism 45 comprises a first link 47 rotatable about a shaft 47c and having two substantially perpendicular arms 47a, 47b, and a second link 48 joined by a pin to the lower distal end of the arm 47b of the first link 47. The upper end of the arm 47a is connected by a pin to the righthand end of the spool member 34 of the first servovalve 30. The lower end of the second link 48 is coupled by a pin to a vertical (as shown) spool member 54 of the second servovalve 50. Consequently, vertical movement of the spool member 54 of the second servovalve 50 causes the spool member 34 of the first servovalve 30 to move to the left or right.

The second servovalve 50 has a housing 51 having two ports 51a, 51b to which two oil pressure lines 102, 104 are connected, respectively, and the spool member 54 is vertically slidably disposed in the housing 51. The spool member 54 comprises a piston 54a and a rod 54b extending coaxially downwardly from the piston 54a. The piston 54a is slidably fitted in a cylinder hole 51c defined vertically in the housing 51. The cylinder hole 51c closed by a cover 55, defining a cylinder chamber therein which is divided by the piston 54a into upper and lower cylinder chambers 52, 53. The rod 54b is slidably fitted in a rod hole 51d which is defined coaxially in the housing 51 and extends downwardly from the cylinder hole 51c.

The rod 54b has a recess 54e defined in a peripheral surface and having a tapered surface. A top position detector switch 58 has a spool 58a projecting into the recess 54e. When the spool member 54 moves upwardly, the spool 58a is lifted in a direction away from the rod 54b as the tip end of the spool 58a slides up the tapered surface. Therefore, the top position detector switch 58 can detect when the transmission ratio of the hydraulic motor M is minimum.

The upper and lower cylinder chambers 52, 53 defined by the piston 54a communicate respectively with the oil pressure lines 102, 104 through the ports 51a, 51b. The spool member 54 is moved upwardly or downwardly depending on the magnitude of an oil pressure applied to the piston 54a, the oil pressure being determined by the pressure of working oil supplied through the lines 102, 104 and the pressure-bearing surface areas of the piston 54a in the cylinder chambers 52, 53. The vertical movement of the spool member 54 is transmitted through the link mechanism 45 to the spool member 34 of the first servovalve 30 thereby to move the spool member 34 to the right or left. Accordingly, by controlling the oil pressure supplied through the oil pressure lines 102, 104, the movement of the spool member 34 of the first servovalve 30 can be controlled to move the piston member 32 for thereby controlling the swash plate angle of the hydraulic motor M, so that the displacement of the motor M will be controlled to control the transmission ratio or speed reduction ration. Specifically, when the spool member 54 of the second servovalve 50 is moved upwardly, the piston member 32 of the first servovalve 30 is moved to the right to reduce the swash plate angle of the hydraulic motor M for reducing the displacement of the motor M and hence the speed reduction ratio.

Oil pressure which is supplied to the upper cylinder chamber 52 through the port 51a from the oil pressure line 102 is introduced from the charging pump 10, while being regulated by the charging pressure relief valve 12, through an oil pressure line 101. Oil pressure which is supplied to the lower cylinder chamber 53 through the port 51b is introduced from an oil pressure line 103 branched from the oil pressure line 102 and having an orifice 103a, while being regulated by two duty-ratio-controlled solenoid-operated valves 151, 152, through an oil pressure line 104. The solenoid-operated valve 151 is opened and closed depending on a given duty ratio to control the rate of flow of working oil from the oil pressure line 103 to the oil pressure line 104. The solenoid-operated valve 152 is connected between an oil pressure line 105 branching from the oil pressure line 104 and an oil pressure line 106 connected to a drain through an orifice 106a. The solenoid-operated valve 152 is opened and closed depending on a given duty ratio to control the rate of flow of working oil from the oil pressure line 104 to the drain.

Therefore, the upper cylinder chamber 52 is supplied through the oil pressure line 102 with the charging oil pressure which has been regulated by the charging pressure relief valve 12. The oil pressure line 104 supplied the lower cylinder chamber 53 with an oil pressure which is made lower than the charging oil pressure by the two solenoid-operated valves 151, 152. Since the pressure-bearing surface area of the upper cylinder chamber 52 is smaller than that of the lower cylinder chamber 53, the forces acting on the opposite sides of the spool member 54 under the oil pressures in the upper and lower cylinder chambers 52, 53 are brought into equilibrium when the oil pressure Pu in the upper cylinder chamber 52 is higher than a certain level Pl of the oil pressure in the lower cylinder chamber 53 (Pu>Pl). Therefore, by controlling the solenoid-operated valves 151, 152 to increase the oil pressure supplied to the lower cylinder chamber 53 above the pressure level Pl, the spool member 54 is moved upwardly to reduce the swash plate angle of the hydraulic motor M for thereby reducing the speed reduction ratio, and by controlling the solenoid-operated valves 151, 152 to reduce the oil pressure supplied to the lower cylinder chamber 53 below the pressure level Pl, the spool member 54 is moved downwardly to increase the swash plate angle of the hydraulic motor M for thereby increasing the speed reduction ratio.

The solenoid-operated valves 151, 152 are controlled by a control signal fed from a controller 100 over a signal line 100a.

As shown in FIG. 1, the controller 100 is supplied with a throttle valve opening signal $\theta$th applied from an engine throttle valve opening sensor 161 over a signal line 100c, an intake vacuum signal $P_B$ delivered over a signal line 100d from a vacuum sensor 162 which detects the intake vacuum in an intake manifold, an engine rotational speed signal Ne delivered from an engine rotational speed sensor 163 over a signal line 100e, a vehicle speed signal V delivered over a signal line 100f from a vehicle speed sensor 164 which detects the vehicle speed based on the rotational speed of the output shaft 2, a swash plate angle signal $\theta$th delivered over a signal line 100g from a swash plate angle sensor 165 which detects the swash plate angle of the hydraulic motor M, and an accelerator opening signal $\theta_{AP}$ delivered from an accelerator pedal movement sensor 166 over a signal line 100h. The controller 100 produces a control signal based on the above input signals applied thereto and applies the control signal to the solenoid-operated valves 151, 152 to achieve desired running performance of the motor vehicle.

The controller 100 also sends a control signal over a line 100b to a throttle valve actuator 155 which controls the opening of the throttle valve. The controller 100 produces this control signal based on the input signals for controlling operation of the throttle valve actuator 155 to achieve desired running performance of the motor vehicle.

Operation of the controller 100 to control the transmission T will be described below.

The speed reduction ratio or transmission ratio i (=input shaft rotational speed/output shaft rotational speed) of the continuously variable transmission T is expressed by:

$$i = \frac{Ne}{C \times V} \quad (1)$$

where Ne is the engine rotational speed, V is the vehicle speed, and C' is a constant. The rate di/dt of change of the speed reduction ratio i is determined by differentiating the equation (1) with respect to time t, and given by the following equation (2):

$$di/dt = \frac{1}{C \times V} \times (dNe/dt - \frac{Ne}{C \times V} \times C \times dV/dt) \quad (2)$$

where dNe/dt is the rate of change of the engine rotational speed, and dV/dt (=G) is the acceleration of the motor vehicle. If the target rate of change of the engine rotational speed is indicated by dNeo/dt, the acceleration dV/dt (=G) is the predicted acceleration Ga, and C'=1/C, then the rate di/dt of change of the speed reduction ratio is given by:

$$di/dt = C \times \frac{1}{V} \times dNeo/dt - C \times \frac{Ne}{V^2} \times Ga \quad (3)$$

Therefore, the rate di/dt of change of the speed reduction ratio is represented by the sum of a component $di_N/dt$ (=C×1/V×dNeo/dt) corresponding to the target rate dNeo/dt of change of the engine rotational speed and a component dia/dt (=−C×Ne/V²×Ga) corresponding to the predicted acceleration Ga. The predicted acceleration Ga is derived from the equations (4) through (7) given below.

The output power Pe of the engine E is expressed by:

$$Pe = R\mu + Ra + Pa \quad (4)$$

where R $\mu$ is the resistance from the road surface to the motor vehicle, Ra is the resistance of air to the motor vehicle, and Pa is the reserved horsepower of the engine E. From the equation (4), the reserved horsepower Pa of the engine E is derived as follows:

$$Pa = Pe - (R\mu + Ra) \quad (5)$$

The reserved horsepower Pa is a horsepower of the engine output which is not utilized at the time, and can be used to accelerate the motor vehicle.

The reserved horsepower Pa can also be given by the equation (6):

$$Pa = (W + \Delta W) \times \frac{1}{g} \times Ga \times \left(\frac{V \times 10^3}{60^2}\right) \times \frac{1}{75} \quad (6)$$

where g is the gravitational acceleration (9.8 m/s²), W is the total weight of the motor vehicle, and $\Delta W$ is the equivalent weight of the rotating parts of a power train. From, the equation (6), we get:

$$Ga = Pa \times \frac{g \times 60^2 \times 75}{(W + \Delta W) \times (V \times 10^3)} \quad (7)$$

Therefore, the predicted acceleration Ga can be calculated from the reserved horsepower Pa of the engine E, and the reserved horsepower Pa is determined according to the equation (5).

From the predicted acceleration Ga given by the equation (7) above, the component dia/dt corresponding to the predicted acceleration is expressed as follows:

$$dia/dt = -C \times \frac{Ne}{V^2} \times Pa \times \frac{g \times 60^2 \times 75}{(W + \Delta W) \times (V \times 10^3)} \quad (8)$$

$$= -C_2 \times \frac{Ne}{V^3} \times Pa$$

where $C_2$ is a constant.

Therefore, the rate di/dt of change of the speed reduction ratio can be expressed as follows:

$$di/dt = C_1 \times \frac{1}{V} \times dNeo/dt - C_2 \times \frac{Ne}{V^3} \times Pa \quad (9)$$

where $C_1$ is a constant. The terms of the above equation can be weighted by varying the constants $C_1$, $C_2$.

The target rate dNeo/dt of change of the engine rotational speed is determined by calculating the difference $\Delta Ne$ between the target engine rotational speed Neo which is set according to an indication of the driver's intention for acceleration or deceleration, such as the amount of depression of the accelerator pedal, for example, and the actual engine rotational speed Ne, and finding a suitable value from a table which contains predetermined target rates dNeo/dt that correspond to the speed differences $\Delta Ne$ in view of vehicle running conditions as felt by the driver and fuel consumption.

Consequently, when a reserved horsepower Pa to obtain a desired acceleration is established by controlling the throttle valve and the transmission is controlled using the rate di/dt of change of the speed reduction ratio which is determined according to the equation (9) above, the desired acceleration can be achieved.

A control sequence for controlling the speed reduction ratio and the throttle valve to establish and obtain the target acceleration will be described below with reference to FIG. 3.

Figure 3:
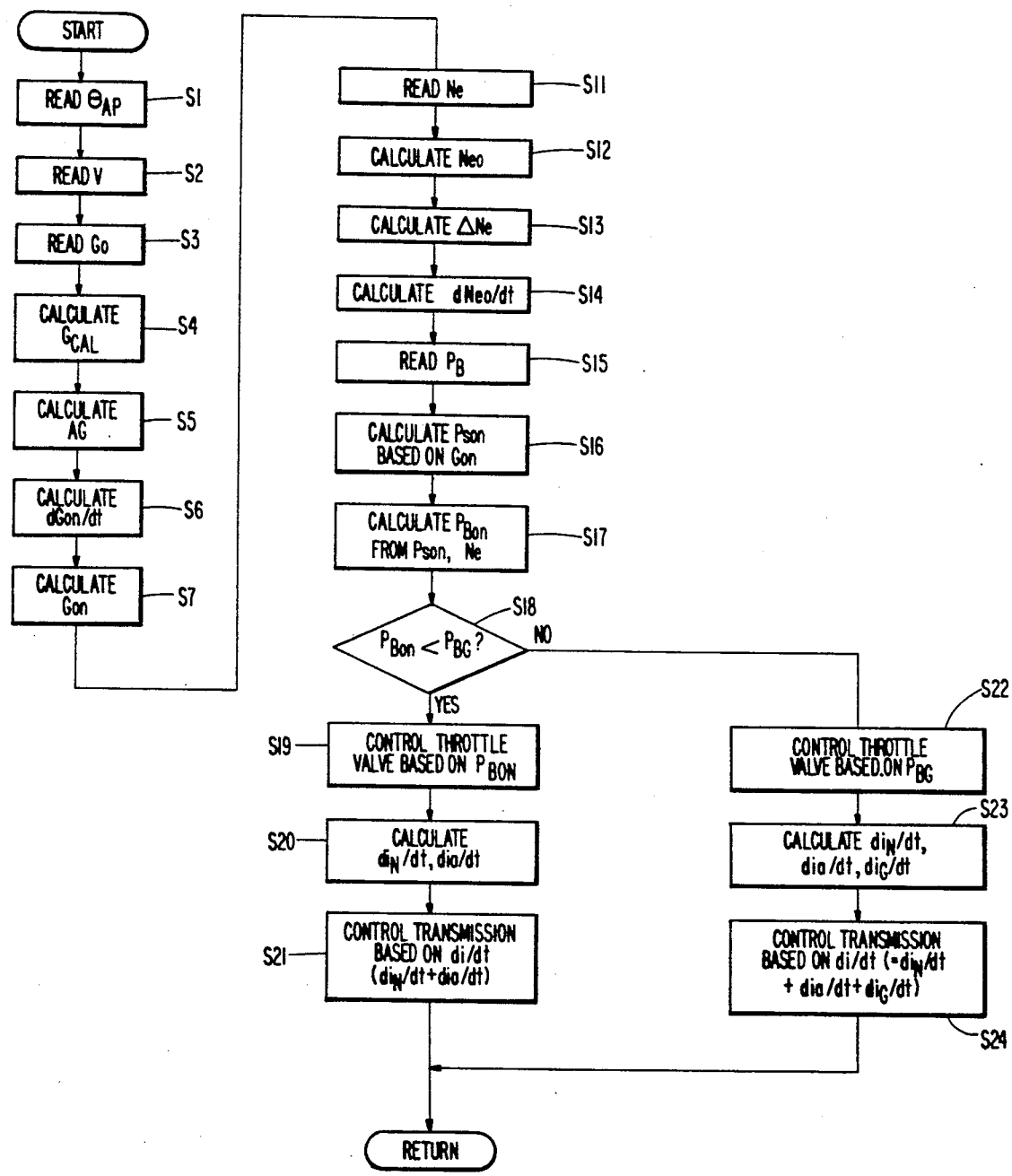
FIG. 3 is a flowchart of a control process of the method according to the invention.
Figure 4:
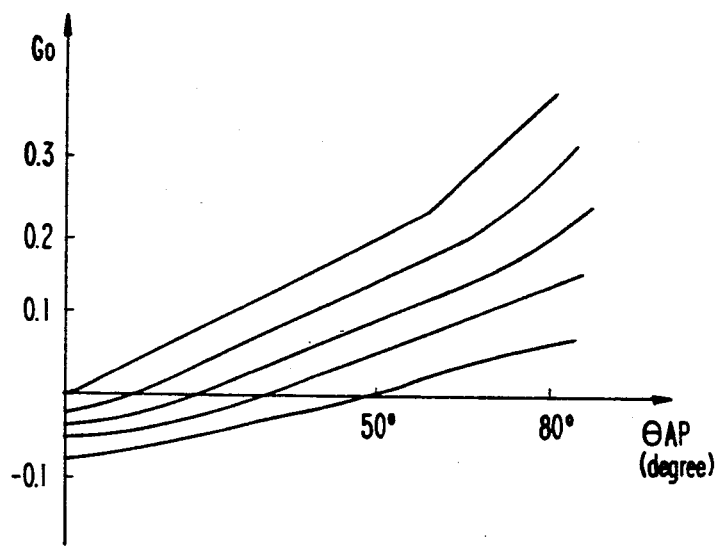
FIG. 4 is a graph showing the relationship between an accelerator opening, a vehicle speed, and a target acceleration to be reached.

FIG. 3 shows a control process according to the present invention. As shown in FIG. 3, an accelerator opening (the amount of depression of the accelerator pedal) $\theta_{AP}$ is read in a step S1, and then a vehicle speed V is read in a step S2. A target terminal acceleration Go to be reached is determined from the accelerator opening $\theta_{AP}$ and the vehicle speed V in a step S3. As shown in FIG. 4, there are predetermined values of the target terminal acceleration Go to be reached for respective vehicle speeds $V_1$ through $V_5$, the target acceleration values Go being plotted against values of the accelerator opening $\theta_{AP}$. A target terminal acceleration Go which corresponds to the accelerator opening $\theta_{AP}$ and the vehicle speed V that are thus read is read from FIG. 4, so that the target terminal acceleration for obtaining a desired driver's acceleration feeling corresponding to the accelerator pedal depression at the vehicle speed can be achieved. In FIG. 4, the vehicle speeds $V_1$ through $V_5$ are selected such that $V_1 = 0$–20 km/h, $V_2 = 40$ km/h, ..., $V_5 = 150$ km/h, for example.

Then, a calculative acceleration $G_{CAL}$ corresponding to the present reserved power of the engine is calculated in a step S4. Since the reserved horsepower Pa of the engine is given by the equation (5) above, the predicted acceleration Ga is calculated using the reserved horsepower Pa according to the equation (5), and the predicted acceleration Ga thus determined is the calculative acceleration $G_{CAL}$.

Figure 5:
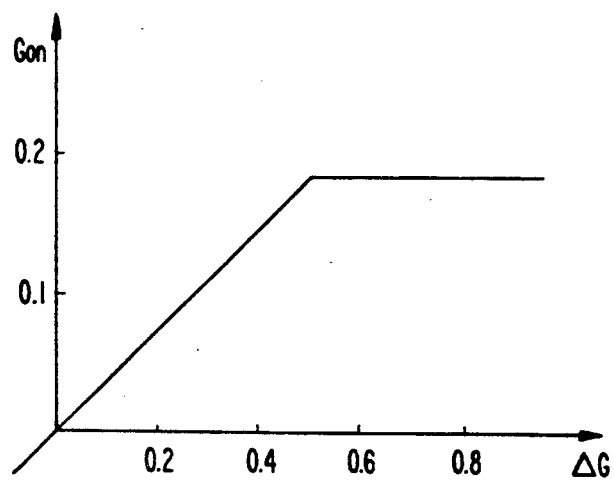
FIG. 5 is a graph showing the relationship between an acceleration difference and a corrective value for acceleration.

The difference $\Delta G$ ($= Go - G_{CAL}$) between the target terminal acceleration Go and the calculative acceleration $G_{CAL}$ is calculated in a step S5. Based on the acceleration difference $\Delta G$, a corrective value dGon/dt for the calculative acceleration $G_{CAL}$, which is necessary to vary the present acceleration (calculative acceleration $G_{CAL}$) up to the target terminal acceleration Go along a desired characteristic curve, is calculated on the basis of the acceleration difference $\Delta G$ in a step S6. The corrective value dGon/dt is determined, for example, using a map or graph as shown in FIG. 5 which contains calculated corrective values corresponding to different values of the acceleration difference $\Delta G$. Therefore, the desired corrective value dGon/dt corresponding to the present acceleration difference $\Delta G$ calculated in the step S5 can be found in the graph of FIG. 5 according to the solid-line curve therein.

Then, the corrective value dGon/dt is added to the calculative acceleration $G_{CAL}$ to obtain a target present acceleration Gon ($= G_{CAL} + $dGon/dt) in a step S7. This target present acceleration Gon is an acceleration which is required at the present time to vary the present calculative acceleration $G_{CAL}$ up to the target terminal acceleration Go along the desired characteristic curve. The throttle valve opening and the speed reduction ratio of the transmission are controlled in order to the target present acceleration Gon.

Figure 6:
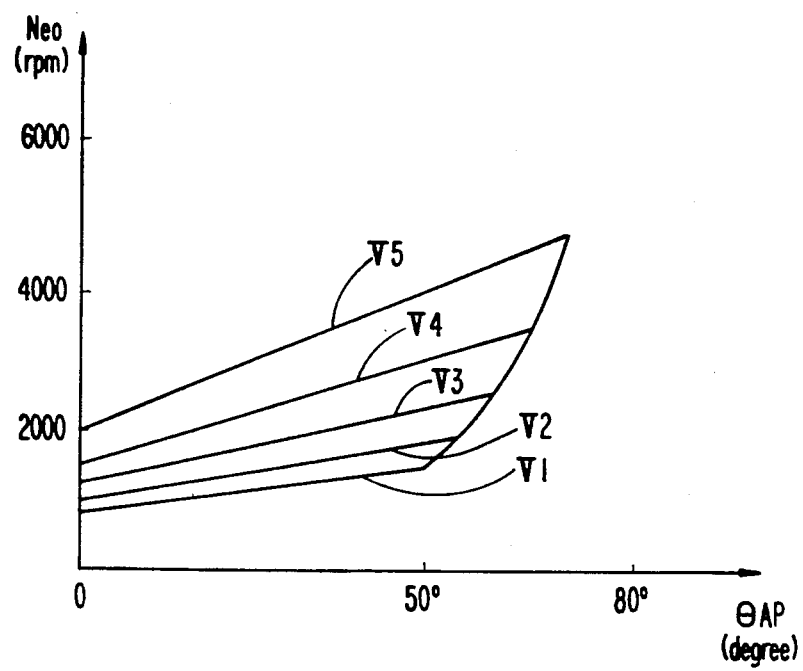
FIG. 6 is a graph showing the relationship between an accelerator opening, a vehicle speed, and a target engine rotational speed.

For such control, the engine rotational speed Ne is read in a step S11, and then a target engine rotational speed Neo which corresponds to the accelerator opening $\theta_{AP}$ and the vehicle speed V that have already been read in is calculated in a step S12. As shown in FIG. 6, values of the target engine rotational speed Neo are preset for the vehicle speeds $V_1$ through $V_5$ and plotted against values of the accelerator opening $\theta_{AP}$. Therefore, the target engine rotational speed Neo is determined in the step S12 which corresponds to the present accelerator opening $\theta_{AP}$ and vehicle speed V that have been read in the steps S1, S2.

Figure 7:
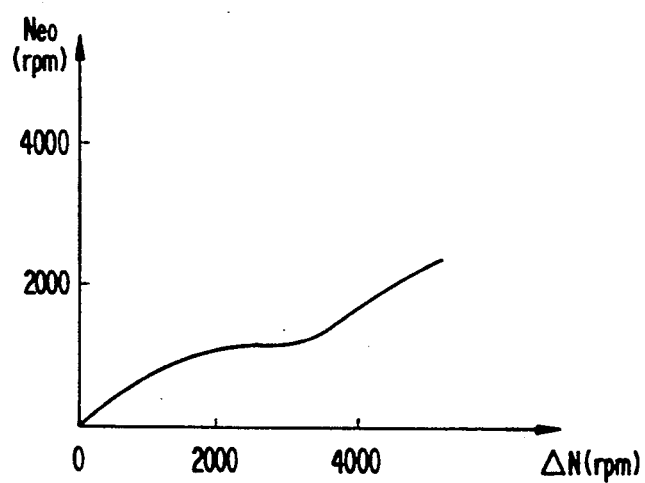
FIG. 7 is a graph showing the relationship between a rotational speed difference and the rate of change of a target engine rotational speed.

Then, a step S13 calculates the difference $\Delta Ne$ (=Neo−Ne) between the target engine rotational speed Neo and the present engine rotational speed Ne read in the step S11. Based on the rotational speed difference $\Delta Ne$, a present target rate dNeo/dt of change of the engine rotational speed, which rate is required to vary the present engine rotational speed Ne up to the target rotational speed Neo along a desired characteristic curve, is calculated and temporarily stored in a memory in a step S14. The target rate dNeo/dt is determined from the graph of FIG. 7, for example, which contains preset rates of change of the engine rotational speed such that the engine rotational speed will vary along a desired characteristic curve depending on the rotational speed difference $\Delta Ne$.

Then, control goes to a step S15 in which the intake vacuum $P_B$ of the engine as detected by the vacuum sensor 162 is read, and a present engine horsepower $P_{SRL}$ is calculated according to the intake vacuum $P_B$ and the engine rotational speed Ne. Thereafter, a target engine horsepower Pson required to obtain the target present acceleration Gon is determined according to the following equation (10) in a step S16:

$$P_{son} = \frac{Gon \times (W + \Delta W) \times V \times 10^3}{60^2 \times 75} + P_{SRL} \quad (10)$$

With the target engine horsepower Pson thus calculated, a target intake vacuum $P_{Bon}$, which is required to vary the present engine horsepower $P_{SRL}$ up to the target engine horsepower Pson at the engine rotational speed Ne at this time, is calculated in a step S17. For such a calculation, a map containing values of the engine horsepower Ps depending on values of the engine intake vacuum $P_B$ and values of the engine rotational speed Ne may be employed, and the engine horsepower corresponding to the target engine horsepower Pson and the engine rotational speed Ne may be determined from the map.

The throttle valve of the engine may then be controlled in order to achieve the target intake vacuum $P_{Bon}$ which is thus obtained. However, when the throttle valve opening is reduced smaller than a predetermined opening and the intake vacuum becomes higher than a predetermined level $P_{BG}$, the engine horsepower is very small, and the throttle valve opening control is not effective enough to adjust the engine horsepower.

To cope with the above shortcoming, a step S18 determines whether the target intake vacuum $P_{Bon}$ is lower than the predetermined value $P_{BG}$ or not, so that different control modes will be performed in case $P_{Bon} < P_{BG}$ or $P_{Bon} \geq P_{BG}$.

If $P_{Bon} < P_{BG}$, then the engine throttle valve is controlled so that the target intake vacuum $P_{Bon}$ will be obtained in a step S19. Now, an engine horsepower which is suitable and required to reach the target present acceleration Gon can be generated. Simultaneously with this throttle valve control, the speed reduction ratio of the continuously variable transmission is also controlled. To this end, a component $di_N/dt$ ($=C_1 \times 1/V \times dNeo/dt$) corresponding to the target rate dNeo/dt of change of the engine rotational speed and a component $dia/dt$ ($= -C_2 \times Ne/V^3 \times Pa$, which can be obtained according to the equation (8)) corresponding to the predicted acceleration that is determined using the reserved horsepower Pa of the engine are determined in a step S20. By substituting these components in the equation (9), a rate di/dt ($=di_N/dt+dia/dt$) of change of the speed reduction ratio is determined, and the solenoid-operated valves 151, 152 are controlled, i.e., the speed reduction ratio of the transmission is controlled, in order to obtain the rate di/dt in a step S21. In this manner, the motor vehicle can be accelerated (or decelerated) according to the target present acceleration Gon.

If $P_{Bon} \geq P_{BG}$, then control goes from the step S18 to a step S22 in which the engine throttle valve is controlled so that the intake vacuum $P_B$ is equalized to the predetermined value $P_{BG}$ (constant). Since the engine horsepower cannot be adjusted by the throttle valve control at this time, the transmission control is effected to make up for the engine horsepower adjustment. Using the difference (Gon−$G_{CAL}$) between the target present acceleration Gon and the calculative acceleration $G_{CAL}$, a corrective component $di_G/dt$ is calculated according to the following equation (11) in a step S23.

$$di_G/dt = C_3 \times \frac{Ne}{V_2} \times (Gon - G_{CAL}) \quad (11)$$

The corrective component $di_G/dt$ is then added to the equation (9) to calculate a rate di/dt ($=di_N/dt+dia/dt+di_G/dt$) of change of the speed reduction ratio. Then, the solenoid-operated valves 151, 152 are controlled, i.e., the speed reduction ratio of the transmission is controlled, in order to obtain the rate di/dt in a step S24. The motor vehicle can also be accelerated (or decelerated) according to the target present acceleration Gon.

The above flow or control sequence is cyclically repeated every preset period of time (e.g., every 10 ms) for continuously controlling the speed reduction ratio along a desired acceleration (or deceleration) characteristic curve. If the speed reduction ratio is controlled through the duty ratio control of the solenoid-operated valves as with the illustrated embodiment, then a control signal for the solenoid-operated valves is issued every 100 ms, for example, even though the control sequence is repeated every 10 ms, because the mechanical parts of the solenoid-operated valves have slow responses.

A control method according to a second embodiment of the present invention will be described with reference to FIG. 8.

A target present acceleration Gon is determined in steps 1 through 7 which is exactly the same as the steps 1 through 7 shown in FIG. 3. Therefore, the steps 1 through 1 shown in FIG. 8 will not be described below.

Figure 8:
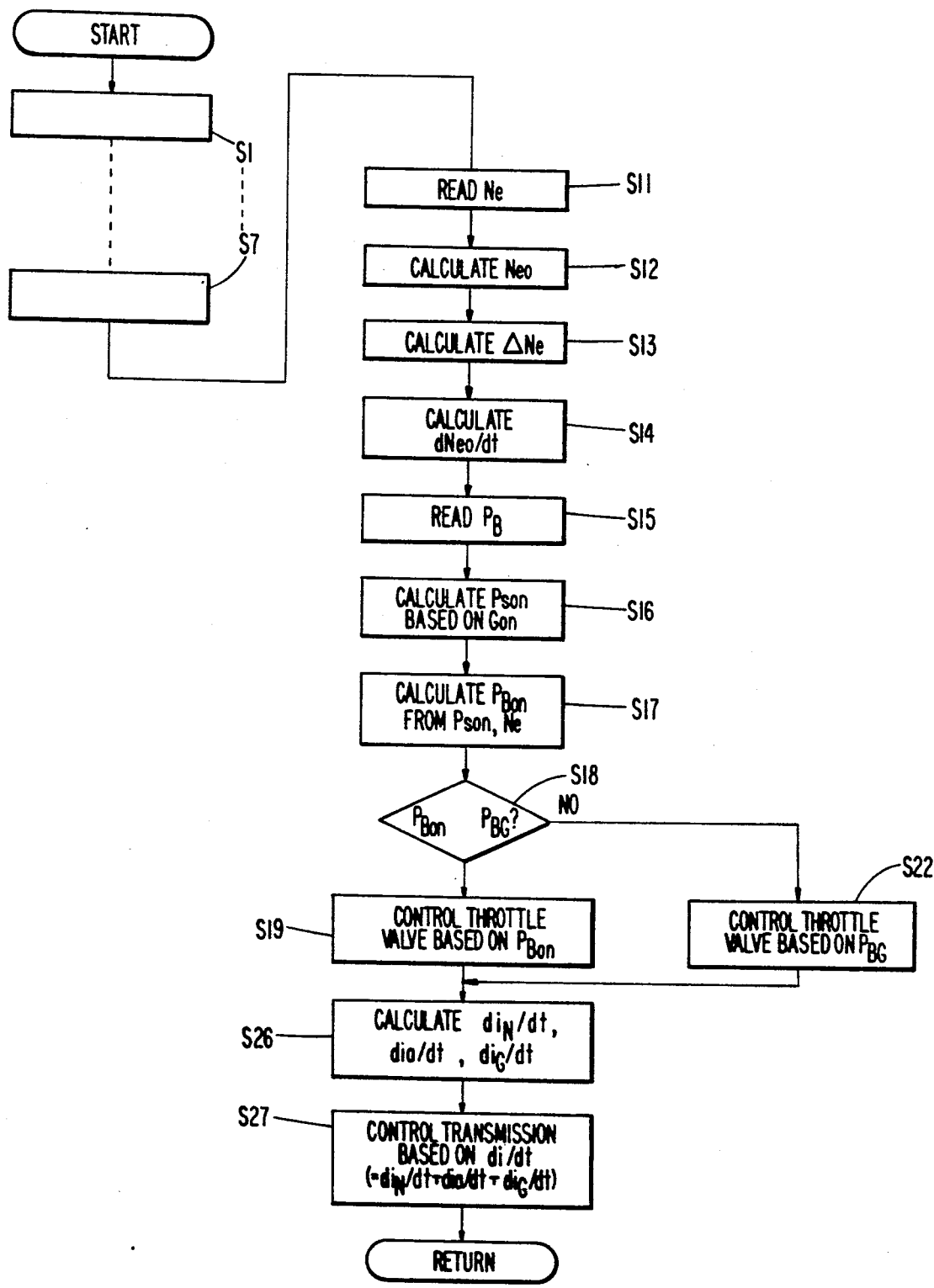
FIGS. 8 and 9 are flowcharts of control processes according to other embodiments of the present invention.

Steps S11 through S22 shown in FIG. 8 are also identical to those shown in FIG. 3.

In the control sequence shown in FIG. 3, if the target intake vacuum $P_{Bon}$ is lower than the predetermined value $P_{BG}$, the rate di/dt of change of the speed reduction ratio is determined according to the equation (9), and if the target intake vacuum $P_{Bon}$ is equal to or higher than the predetermined value $P_{BG}$, the corrective component determined according to the equation (11) is added to the equation (9), thus obtaining the rate di/dt of change of the speed reduction ration, and the speed reduction ratio is controlled on the basis of the rate di/dt thus determined.

According to the control method shown in FIG. 8, however, the steps S19, S22 are followed by a step S26 irrespective of whether $P_{Bon} < P_{BG}$ or $P_{Bon} \geq P_{BG}$. In the step S26, there are determined a component $di_N/dt$ ($= C_1 \times 1/V \times dNeo/dt$) corresponding to the target rate $dNeo/dt$ of change of the engine rotational speed, a component $di_a/dt$ ($= -C_2 \times Ne/V^3 \times Pa$) corresponding to the predicted acceleration, and a corrective component $di_G/dt$ ($= C_3 \times Ne/V^2 \times (Gon - G_{CAL})$). These components are added thereby calculating the rate $di/dt$ of change of the speed reduction ratio. Then, the speed reduction ratio is controlled on the basis of the rate $di/dt$ thus found. The control mode shown in FIG. 8 can control the speed reduction ratio with a good response.

A control method according to a third embodiment of the present invention will be described with reference to FIG. 9.

A target present acceleration Gon is determined in steps 1 through 7 which is exactly the same as the steps 1 through 7 shown in FIG. 3. Therefore, the steps 1 through 1 shown in FIG. 9 will not be described below.

After the target present acceleration Gon has been calculated in the steps S1 through S7, control proceeds to a step S31 which calculates a target engine horsepower Pson required to obtain the target present acceleration Gon. This calculations is the same as the calculation in the step S17 in the control sequence of FIG. 3. Specifically, the present engine horsepower $P_{SRL}$ is calculated from the engine intake vacuum $P_B$ and the engine rotational speed Ne, and the target engine horsepower Pson required to obtain the target present acceleration Gon is determined according to the equation (10).

Then, a target engine rotational speed Neo is calculated on the basis of the target engine horsepower Pson in a step S32. The target engine rotational speed Neo may be found from a map which contains data representative of the relationship between value of the engine horsepower P and values of the engine rotational speed Ne on a minimum fuel consumption curve, for example. This allows the speed reduction ratio to be controlled for better fuel economy.

Thereafter, the difference $\Delta Ne$ between the target engine rotational speed Neo and the present engine rotational speed Ne is calculated in a step S33. Based on the rotational speed difference $\Delta Ne$, a present target rate $dNeo/dt$ of change of the engine rotational speed, which rate is required to vary the present engine rotational speed Ne up to the target rotational speed Neo along a desired characteristic curve, is calculated in a step S34. The target rate $dNeo/dt$ is determined from the graph of FIG. 7, for example, which contains preset rates of change of the engine rotational speed such that the engine rotational speed will vary along a desired characteristic curve depending on the rotational speed difference $\Delta Ne$.

Then, a step S35 determines whether the target rate $dNeo/dt$ of change of the engine rotational speed is smaller than a predetermined value $dN_G/dt$ or not. If the rate $dNeo/dt$ is larger than or equal to the predetermined value $dN_G/dt$, then in a step S36 the predetermined value $dN_G/dt$ is set as the target rate $dNeo/dt$ of change of the engine rotational speed. Then, a component $di_N/dt$ corresponding to the target rate $dNeo/dt$ of change of the engine rotational speed is calculated in a step S37. If in the step S35 it is determined that the target rate $dNeo/dt$ of change of the engine rotational speed is smaller than the predetermined value $dN_G/dt$, then the control method skips the step S36 and proceeds to the step S37.

As with the control sequence shown in FIG. 3, a component $di_a/dt$ corresponding to the predicted acceleration and a corrective component $di_G/dt$ are calculated according to the equations (8) and (11) in a step S38. In calculating the corrective component $di_G/dt$, the calculative acceleration $G_{CAL}$ may be calculated as a value under a reference intake vacuum (which may have a substantially intermediate value of $-300$ Hg, for example). This allows the speed reduction ratio to be controlled for better fuel economy though control responses are slightly lowered. Thereafter, the calculated components are added thereby calculating a rate $di/dt$ ($= di_N/dt + di_a/dt + di_G/dt$) of change of the speed reduction ratio, and the speed reduction ratio of the continuously variable transmission is controlled on the basis of the rate $di/dt$ in a step S39.

At the same time that the speed reduction ratio is controlled as described above, the throttle valve of the engine is controlled in steps S40 through S43. This throttle valve control is the same as the steps S18 through S22 shown in FIG. 3. Specifically, a target intake vacuum $P_{Bon}$ required to vary the engine horsepower up to a target horsepower Pson is determined from the target engine horsepower Pson and the engine rotational speed Ne, and the throttle valve is controlled so that the target intake vacuum $P_{Bon}$ will be obtained. In this control sequence, the different control modes are performed depending on whether the target intake vacuum $P_{Bon}$ is higher or lower than the predetermined value $P_{BG}$.

Figure 9:
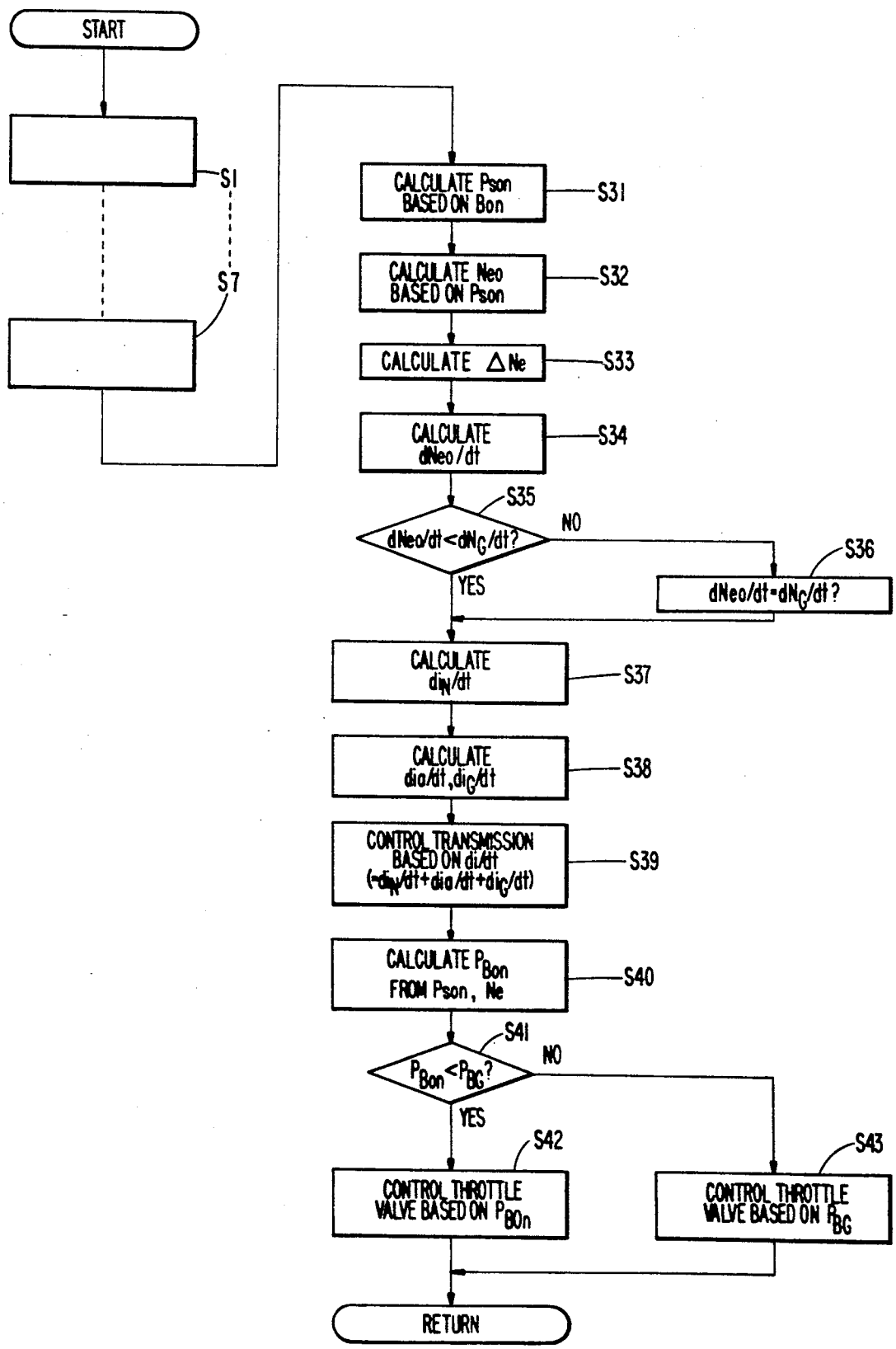

The above flow or control sequence of FIG. 9 is repeated at predetermined intervals of time to carry out the throttle valve control and the speed reduction ratio control.

The control method has been described as being applied to a continuously variable transmission which comprises a hydraulic pump and a hydraulic motor. However, the same principles are also applicable to any of various other types of continuously variable transmission.

With the above embodiments, as described above, a target terminal acceleration Go is established according to an indication of the driver's intention for acceleration or deceleration, such as the amount of depression of the accelerator pedal, and also to an indication of the speed of the motor vehicle, and a present calculative acceleration $G_{CAL}$ is calculated on the basis of a reserved power at the present time of the engine which drives the continuously variable transmission. Then, a target present acceleration Gon required at the present time to vary the present acceleration up to the target terminal acceleration Go to be reached along a desired characteristic curve (e.g., a characteristic curve which gives the driver an acceleration feeling that is demanded by the driver) is established according to the difference $\Delta G$ ($= Go - G_{CAL}$) between the target terminal acceleration Go and the calculative acceleration $G_{CAL}$. Thereafter, the throttle valve of the engine and the continuously variable transmission are controlled so that the target present acceleration Gon will be reached.

With the continuously variable transmission being thus controlled, the motor vehicle runs in a manner to meet the driver's demand for acceleration, represented by the depression by the driver of the accelerator pedal. Since the transmission and the throttle valve are controlled using, as a target value, the acceleration (or deceleration) whose changes can be sensed by the driver, the desired characteristic which meets the demand of the driver is reliably achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a continuously variable transmission coupled to the output shaft of an engine having a throttle valve and mounted on a motor vehicle, comprising the steps of:

establishing a target terminal acceleration Go to be reached according to an indication of a driver's intention for acceleration or deceleration, such as the amount of depression of the accelerator pedal, and also to an indication of the speed of the motor vehicle;

calculating a calculative acceleration $G_{CAL}$ at a present time on the basis of a reserved power Pa of the engine which drives the continuously variable transmission;

establishing a target present acceleration Gon required at the present time to vary the present acceleration up to the target terminal acceleration Go along a desired characteristic curve according to the difference $\Delta G$ ($=Go-G_{CAL}$) between said target terminal acceleration Go and said calculative acceleration $G_{CAL}$; and controlling at least one of the throttle valve of the engine and the continuously variable transmission so that said target present acceleration Gon will be reached.

2. A method according to claim 1, wherein said calculative acceleration $G_{CAL}$ is determined on the basis of said reserved power Pa of the engine according to the equation:

$$G_{CAL} = Pa \times \frac{g \times 60^2 \times 75}{(W + \Delta W) \times (V \times 10^3)}$$

where
g is the gravitational acceleration;
W is the total weight of the motor vehicle;
$\Delta W$ is the equivalent weight of the rotational parts of the drive system of the motor vehicle; and
V is the speed of the motor vehicle;
said reserved power Pa of the engine being a power which is available but not used corresponding to an accelerator opening.

3. A method according to claim 1, further comprising the steps of:

calculating a present engine horsepower $P_{SRL}$ from an engine intake vacuum $P_B$ and an engine rotational speed Ne;

determining a target engine horsepower Pson required to obtain said target acceleration Gon according to the equation:

$$Pson = \frac{Gon \times (W + \Delta W) \times V \times 10^3}{60^2 \times 75} + P_{SRL}$$

where
W is the total weight of the motor vehicle;
$\Delta W$ is the equivalent weight of the rotational parts of the drive system of the motor vehicle; and
V is the speed of the motor vehicle;

calculating a target engine intake vacuum $P_{Bon}$ required to vary said present engine horsepower $P_{SRL}$ up to said target engine horsepower Pson at said engine rotational speed Ne;

if the target intake vacuum $P_{Bon}$ is lower than a predetermined value $P_{BG}$, controlling the throttle valve of the engine so that said target intake vacuum $P_{Bon}$ will be obtained; and if the target intake vacuum $P_{Bon}$ is equal to or higher than the predetermined value $P_{BG}$, controlling the throttle valve of the engine so that the intake vacuum will be of said predetermined value $P_{BG}$.

4. A method according to claim 3, wherein a map indicative of the correlation between the engine intake vacuum $P_B$, the engine rotational speed Ne, and the engine horsepower Ps is established, and said present engine horsepower $P_{SRL}$ and said target intake vacuum $P_{Bon}$ are determined from said map.

5. A method according to claim 3, further comprising the steps of:

if said target intake vacuum $P_{Bon}$ is lower than said predetermined value $P_{BG}$, calculating a target engine rotational speed Neo corresponding to the indication of the driver's intention for acceleration or deceleration and the indication of the speed of the motor vehicle, and also calculating the difference $\Delta Ne$ ($=Neo-Ne$) between the target engine rotational speed Neo and the present engine rotational speed Ne;

calculating a target rate dNeo/dt of change of the engine rotational speed, which is required at the present time to vary the present engine rotational speed Ne up to said target engine rotational speed Neo along a desired characteristic curve, based on said difference $\Delta Ne$;

determining a component $di_N/dt$ corresponding to said target rate dNeo/dt according to the equation:

$$di_N/dt = C_1 \times \frac{1}{V} \times (dNeo/dt)$$

where
$C_1$ is a constant;
determining a component dia/dt corresponding to a predicted acceleration, using the reserved horsepower Pa of the engine, according to the equation:

$$dia/dt = -C_2 \times (Ne/V^3) \times Pa$$

where
$C_2$ is a constant;
adding said components $di_N/dt$ and dia/dt, thereby determining a rate di/dt of change of the speed reduction ratio of the continuously variable transmission; and
controlling the speed reduction ratio of the continuously variable transmission so that said rate di/dt of change of the speed reduction ratio will be obtained.

6. A method according to claim 3, further comprising the steps of:

if said target intake vacuum $P_{Bon}$ is equal to or higher than said predetermined value $P_{BG}$, calculating a target engine rotational speed Neo corresponding to the indication of the driver's intention for acceleration or deceleration and the indication of the speed of the motor vehicle, and also calculating the difference $\Delta Ne$ ($=Neo-Ne$) between the target engine rotational speed Neo and the present engine rotational speed Ne;

calculating a target rate dNeo/dt of change of the engine rotational speed, which is required at the present time to vary the present engine rotational speed Ne up to said target engine rotational speed Neo along a desired characteristic curve, based on said difference $\Delta Ne$;

determining a component $di_N/dt$ corresponding to said target rate dNeo/dt according to the equation:

$$di_N/dt = C_1 \times \frac{1}{V} \times (dNeo/dt)$$

where
$C_1$ is a constant;

determining a component dia/dt corresponding to a predicted acceleration, using the reserved horsepower Pa of the engine, according to the equation:

$$dia/dt = - C_2 \times \frac{Ne}{V^3} \times Pa$$

where
$C_2$ is a constant;

determining a corrective component $di_G/dt$ according to the equation:

$$di_G/dt = C_3 \times \frac{Ne}{V^2} (Gon - G_{CAL})$$

where
$C_3$ is a constant;

adding said components $di_N/dt$, dia/dt, and $di_G/dt$, thereby determining a rate di/dt of change of the speed reduction ratio of the continuously variable transmission; and controlling the speed reduction ratio of the continuously variable transmission so that said rate di/dt of change of the speed reduction ratio will be obtained.

7. A method according to claim 1, wherein said throttle valve is controlled by a throttle valve actuator which is operable in response to a control signal from a controller.

8. A method according to claim 1, wherein said continuously variable transmission has a hydraulic pump drivable by said engine and a hydraulic motor drivable by oil pressure supplied from said hydraulic pump, at least one of said hydraulic pump and said hydraulic motor being of the variable displacement type, said method further comprising the step of:

controlling said continuously variable transmission by controlling the variable displacement of said hydraulic pump or said hydraulic motor.

9. A method according to claim 1, further comprising the steps of:

calculating a target engine rotational speed Neo corresponding to the indication of the driver's intention for acceleration or deceleration and the indication of the speed of the motor vehicle, and also calculating a difference $\Delta Ne$ ($=Neo-Ne$) between the target engine rotational speed Neo and the present engine rotational speed Ne;

calculating a target rate dNeo/dt of change of the engine rotational speed, which is required at the present time to vary the present engine rotational speed Ne up to said target engine rotational speed Neo along a desired characteristic curve, based on said difference $\Delta Ne$;

determining a component $di_N/dt$ corresponding to said target rate dNeo/dt according to the equation:

$$di_N/dt = C_1 \times \frac{1}{V} \times (dNeo/dt)$$

where
$C_1$ is a constant;

determining a component dia/dt corresponding to a predicted acceleration, using the reserved horsepower Pa of the engine, according to the equation:

$$dia/dt = - C_2 \times \frac{Ne}{V^3} \times Pa$$

where
$C_2$ is a constant;

determining a corrective component $di_G/dt$ according to the equation:

$$di_G/dt = C_3 \times \frac{Ne}{V^2} (Gon - G_{CAL})$$

where
$C_3$ is a constant;

adding said components $di_N/dt$, dia/dt, and $di_G/dt$, thereby determining a rate di/dt of change of the speed reduction ratio of the continuously variable transmission; and controlling the speed reduction ratio of the continuously variable transmission so that said rate di/dt of change of the speed reduction ratio will be obtained.

10. A method according to claim 1, further comprising the steps of:

calculating a present engine horsepower $P_{SRL}$ from an engine intake vacuum $P_B$ and an engine rotational speed Ne;

determining a target engine horsepower Pson required to obtain said target acceleration Gon according to the equation:

$$Pson = \frac{Gon \times (W + \Delta W) \times V \times 10^3}{60^2 \times 75} + P_{SRL}$$

where
W is the total weight of the motor vehicle;
$\Delta W$ is the equivalent weight of the rotational parts of the drive system of the motor vehicle; and
V is the speed of the motor vehicle;

determining a target rotational speed Neo corresponding to said target engine horsepower based on the correlation between values of the engine horsepower and values of the engine rotational speed on a minimum fuel consumption curve;

calculating the difference $\Delta Ne$ ($=Neo-Ne$) between the target engine rotational speed Neo and the present engine rotational speed Ne;

calculating a target rate $dNeo/dt$ of change of the engine rotational speed, which is required at the present time to vary the present engine rotational speed Ne up to said target engine rotational speed Neo along a desired characteristic curve, based on said difference $\Delta Ne$;

determining a component $di_N/dt$ corresponding to said target rate $dNeo/dt$ according to the equation:

$$di_N/dt = C_1 \times \frac{1}{V} \times (dNeo/dt)$$

where $C_1$ is a constant;

determining a component $dia/dt$ corresponding to a predicted acceleration, using the reserved horsepower Pa of the engine, according to the equation:

$$dia/dt = -C_2 \times \frac{Ne}{V^3} \times Pa$$

where $C_2$ is a constant;

determining a corrective component $di_G/dt$ according to the equation:

$$di_G/dt = C_3 \times \frac{Ne}{V^2} (Gon - G_{CAL})$$

where $C_3$ is a constant;

adding said components $di_N/dt$, $dia/dt$, and $di_G/dt$, thereby determining a rate $di/dt$ of change of the speed reduction ratio of the continuously variable transmission; and controlling the speed reduction ratio of the continuously variable transmission so that said rate $di/dt$ of change of the speed reduction ratio will be obtained.

11. A method according to claim 10, wherein if said target rate $dNeo/dt$ of change of the engine rotational speed is larger than or equal to a predetermined value $dN_G/dt$, said predetermined value $dN_G/dt$ is set as the value of said target rate $dNeo/dt$.

12. A method of controlling a continuously variable transmission according to claim 1, wherein said target present acceleration Gon is established by:

calculating the difference $\Delta G$ between said target terminal acceleration Go and said calculative acceleration $G_{CAL}$, determining a corrective value $dGon/dt$ on the basis of the difference $\Delta G$, and calculating said target present acceleration Gon by adding the corrective value $dGon/dt$ to the calculative acceleration $G_{CAL}$.

13. A method of controlling a continuously variable transmission according to claim 12, wherein said calculative acceleration $G_{CAL}$ is determined based on said reserved power Pa of said engine according to the equation:

$$G_{CAL} = Pa \times \frac{g \times 60^2 \times 75}{(W + \Delta W) \times (V \times 10^3)}$$

where g is the gravitational acceleration;

W is the total weight of the motor vehicle;

$\Delta W$ is the equivalent weight of the rotational parts of the drive system of the motor vehicle; and V is the speed of the motor vehicle;

said reserved power Pa of the engine being a power which is available but not used.

14. A method of controlling a continuously variable transmission according to claim 12, wherein said corrective value $dGon/dt$ is determined according to a predetermined relationship between said corrective value $dGon/dt$ and said acceleration difference $\Delta G$.

15. A method of controlling a continuously variable transmission coupled to the output shaft of an engine, said engine having a throttle valve, said engine and said transmission being mounted on a motor vehicle, comprising the steps of:

determining the speed of said vehicle;

determining a target terminal acceleration according to the speed of said vehicle and an indication of a driver's intention of acceleration or deceleration;

determining a reserved power of said engine;

determining a calculative acceleration according to said reserved power of said engine;

determining a target present acceleration required to vary said calculative acceleration to cause said calculative acceleration to correspond to said target terminal acceleration according to a characteristic curve according to a difference between said target terminal acceleration and said calculative acceleration; and controlling said throttle valve and said continuously variable transmission to bring said calculative acceleration into correspondence with the target present acceleration.

* * * * *